US006952966B2

(12) United States Patent
Itakura

(10) Patent No.: US 6,952,966 B2
(45) Date of Patent: *Oct. 11, 2005

(54) APPARATUS FOR DETECTING PHYSICAL QUANTITY

(75) Inventor: Toshikazu Itakura, Toyota (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/801,693

(22) Filed: Mar. 17, 2004

(65) Prior Publication Data

US 2004/0183551 A1 Sep. 23, 2004

(30) Foreign Application Priority Data

Mar. 17, 2003 (JP) ......................................... 2003-072175

(51) Int. Cl.⁷ .......................... G01P 15/125; G01P 21/00
(52) U.S. Cl. ...................................... 73/514.32; 73/1.38
(58) Field of Search ........................ 73/413.32, 514.16, 73/514.18, 862.61, 1.38, 862.626; 324/162, 661, 672, 679; 361/280, 283.1, 283.3

(56) References Cited

U.S. PATENT DOCUMENTS

| | | | |
|---|---|---|---|
| 5,541,860 A | * | 7/1996 | Takei et al. ................. 702/141 |
| 5,633,594 A | | 5/1997 | Okada |
| 6,257,061 B1 | * | 7/2001 | Nonoyama et al. ...... 73/514.32 |
| 6,483,322 B2 | * | 11/2002 | Aoyama et al. ............ 324/661 |
| 6,515,489 B2 | * | 2/2003 | Min et al. .................... 324/662 |
| 6,668,614 B2 | * | 12/2003 | Itakura ....................... 73/1.38 |

FOREIGN PATENT DOCUMENTS

| | | |
|---|---|---|
| JP | A-8-145717 | 6/1996 |
| JP | A-10-170544 | 6/1998 |
| JP | A-10-318754 | 12/1998 |
| JP | A-2000-221054 | 8/2000 |
| JP | A-2003-083749 | 3/2003 |

* cited by examiner

Primary Examiner—Helen Kwok
(74) Attorney, Agent, or Firm—Posz Law Group, PLC

(57) ABSTRACT

An apparatus is provided for concurrently detecting a plurality of physical quantities to be detected. The apparatus comprises plural sensing units, plural processors, and controller. The sensing units are formed on the same substrate to form a single sensor. Each sensing unit senses each physical quantity to output a voltage signal changing depending on each physical quantity sensed. Each of the processors samples and holds, at a predetermined frequency, the voltage signal outputted by each of the sensing units. Hence sampled and held voltage signals are produced and outputted from the apparatus as information indicative of the plurality of physical quantities. In the sampling and holding processing, a controller controls the plural processors so that the processors perform sampling operations at predetermined different phases shifted from each other during an interval defined by the predetermined frequency.

11 Claims, 4 Drawing Sheets

APPARATUS FOR DETECTING PHYSICAL QUANTITY

BACKGROUND OF THE INVENTION

1. Technical Field

The present invention relates to an apparatus for detecting a physical quantity, and in particular, to an apparatus for concurrently detecting a plurality of types of physical quantities, such as acceleration.

2. Related Art

A wide variety of types of detection apparatuses have been known for detecting physical quantities, such as acceleration and pressure. Such detection apparatuses are inevitable for various industrial products including vehicles and industrial robots.

One type of such a physical quantity detecting apparatus is disclosed, for example, by Japanese Patent Laid-open publication Nos. 8-145717 and 2000-221054. These references provide a capacitor type of detection apparatus equipped with a sensor element, a C-V (electric capacitance-voltage) conversion circuit, and a signal processing circuit. The sensor element has capacitance changing in response to mechanical energy such as acceleration and pressure. The C-V conversion circuit is placed to covert voltage depending on changes in the capacitance of the sensor element to allow the voltage to have corresponding values. The signal processing circuit is placed to sample/hold voltage outputted from the C-V conversion circuit. The outputs from the signal processing circuit are subjected to detection of the physical quantities such as acceleration and pressure.

It is frequently desired to detect acceleration generated in different plural directions (for the sake of simplifying the explanation, such directions are to be X-axis and Y-axis directions of the orthogonal coordinate system). To meet such a demand, the above conventional detecting apparatus can be modified into an apparatus capable of detecting, by itself, acceleration generated in the two or more directions.

It is required for such an apparatus to have two sets of circuitry. One set is directed to acceleration generated in the X-axis direction and the other is directed to acceleration generated in the Y-axis direction. To be specific, the one set is composed of X-axis directional components comprising a sensor element whose capacitance depends on the X-axis directional acceleration, a C-V conversion circuit, and a signal processing circuit. The other set is composed of Y-axis directional components comprising a sensor element whose capacitance depends on the Y-axis directional acceleration, a C-V conversion circuit, and a signal processing circuit.

There is a drawback with this configuration, though. This drawback will appear when both the X-axis and Y-axis directional signal processing circuits are brought into synchronous sampling operations. That is, it is difficult for the signal processing circuits to hold the voltage values with precision, because there are various influences resulting from factors including parasitic capacitance which may be present among wiring patterns. Such influences, if actually occurs, will lead to the problem that changes in the capacitance at each sensor element cannot be detected with precision.

This problem will be described in more detail. In general, a sample and hold circuit uses a capacitor charged to hold (memorize) voltage. If a large amount of parasitic capacitance exists between output signal lines from both the X-axis directional C-V conversion circuits, the voltage outputted from the Y-axis directional C-V conversion circuit fluctuates when the X-axis directional signal processing circuit applies sampling to the voltage outputted from the X-axis directional C-V conversion circuit. As a result, the Y-axis directional signal processing circuit is obliged to sample the fluctuating voltage. At the same time, it is also true that, when the Y-axis directional signal processing circuit applies sampling to the voltage outputted from the Y-axis directional C-V conversion circuit, the output voltage of the X-axis directional C-V conversion circuit causes fluctuations. Hence the X-axis directional signal processing circuit has no choice but to sample the fluctuated voltage. These sampling operations give errors to the voltages sampled by the respective signal processing circuits.

Occurrence of this kind of erroneous sampling operation is not limited to the configuration in which a capacitance type of sensor is used, but may be possible even when other types of sensor are employed. On top of this, it is considered that such a drawback becomes remarkable when a plurality of capacitance type sensor elements are formed on the same semiconductor substrate.

This formation will lead to a configuration where the output terminals of both the X-axis and Y-axis directional sensor elements are mutually connected through a parasitic capacitance on the same semiconductor substrate. Hence both of a first signal line from the X-axis directional sensor element to the X-axis directional C-V conversion circuit and a second signal line from the Y-axis directional sensor element to the Y-axis directional C-V conversion circuit are mutually connected via the parasitic capacitance on the semiconductor substrate. The sampling operation carried out by one signal processing circuit therefore has a large influence on that carried out by the other signal processing circuit.

SUMMARY OF THE INVENTION

The present invention has been made with due consideration to the foregoing difficulties, and a first object of the present invention is to provide an apparatus for detecting plural physical quantities, which is able to detect such plural physical quantities with precision. A second object of the present invention is to provide an apparatus for detecting plural physical quantities, which is able to detect such plural physical quantities with precision, while still maintaining the apparatus compact in size.

In order to achieve the first object of the present invention, there is provided, as one aspect of the present invention, an apparatus for detecting a physical quantity to be detected. This apparatus comprises a plurality of sensing units, a plurality of processors, and a controller. Of these, the plurality of sensing units each sense the physical quantity to output a voltage signal which changes depending on the sensed physical quantity. The plurality of processors each sample and hold, at intervals, the voltage signal outputted by each of the sensing units. The controller controls the plurality of processors so that the processors perform sampling operations at predetermined different timings shifted from each other.

It is therefore possible to eliminate or improve a situation where the sampling operation carried out by a sample-and-hold circuit of each of the processors influences largely the other one in terms of sampling accuracy. Errors of the voltage signals sampled and memorized in each sample-and-hold circuit can be avoided or lowered greatly. Accordingly, the apparatus is able to detect, with precision, the physical quantity (e g., acceleration).

It is preferred that each of the plurality of sensing units is provided with a capacitive sensor element of which capacitance changes depending on the physical quantity to be detected and a capacitance-voltage converter converting a change in the capacitance of the sensor element to output the voltage signal, and the sensor elements of the plurality of sensing units are formed on the same substrate to form a single sensor. In this configuration, still improved is a situation where the sampling operation carried out by a sample-and-hold circuit of each of the processors influences largely the other one in terms of sampling accuracy. This greatly enhances the advantage of being compact stemming from forming the two sensor elements on the same substrate.

It is still preferred that each of the sensor elements has a first capacitor and a second capacitor electrically connected in series to each other, at least one of the first and second capacitors having a capacitance changing depending on the physical quantity to be detected and the first and second capacitors receiving first and second driving squire wave signals of which phases are opposite to each other, and the capacitance-voltage converter has a circuit converting a difference between capacitance values of the first and second capacitors to the voltage signal, an input of the circuit being electrically connected to a joint point electrically connecting the first and second capacitors.

By way of example, the physical quantity is acceleration acting on the apparatus.

In order to achieve the second object, as a second aspect of the present invention, there is provided an apparatus for concurrently detecting a plurality of physical quantities to be detected. This apparatus comprises a plurality of sensing units, a plurality of processor, and a controller. The plurality of sensing units are formed on the same substrate to form a single sensor and each sense each of the physical quantities to output a voltage signal changing depending on each of the sensed physical quantities. The plurality of processors each sample and hold, at a predetermined frequency, the voltage signal outputted by each of the sensing units to produce sampled and held voltage signals to be outputted from the apparatus as information indicative of the plurality of physical quantities to be detected. The controller controls the plurality of processors so that the processors perform sampling operations at predetermined different phases shifted from each other during an interval defined by the predetermined frequency.

The detecting apparatus with this configuration is able to detect plural physical quantities with precision, while still maintaining the apparatus compact in size.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENT

Referring to FIGS. 1 to 4A and 4B, an embodiment of a physical quantity detecting apparatus according to the present invention will now be described.

The physical quantity detecting apparatus according to the present embodiment is assigned to detection of acceleration to be generated in plural directions (in the present embodiment, two directions of X-axis and Y-axis directions of the orthogonal coordinate system set to a sensor employed by this apparatus), and is reduced into practice as being an "acceleration detecting apparatus." The quantities of the two types of acceleration generated in such two directions are handled as being a plurality of physical quantities according to the present invention.

Figure 1:
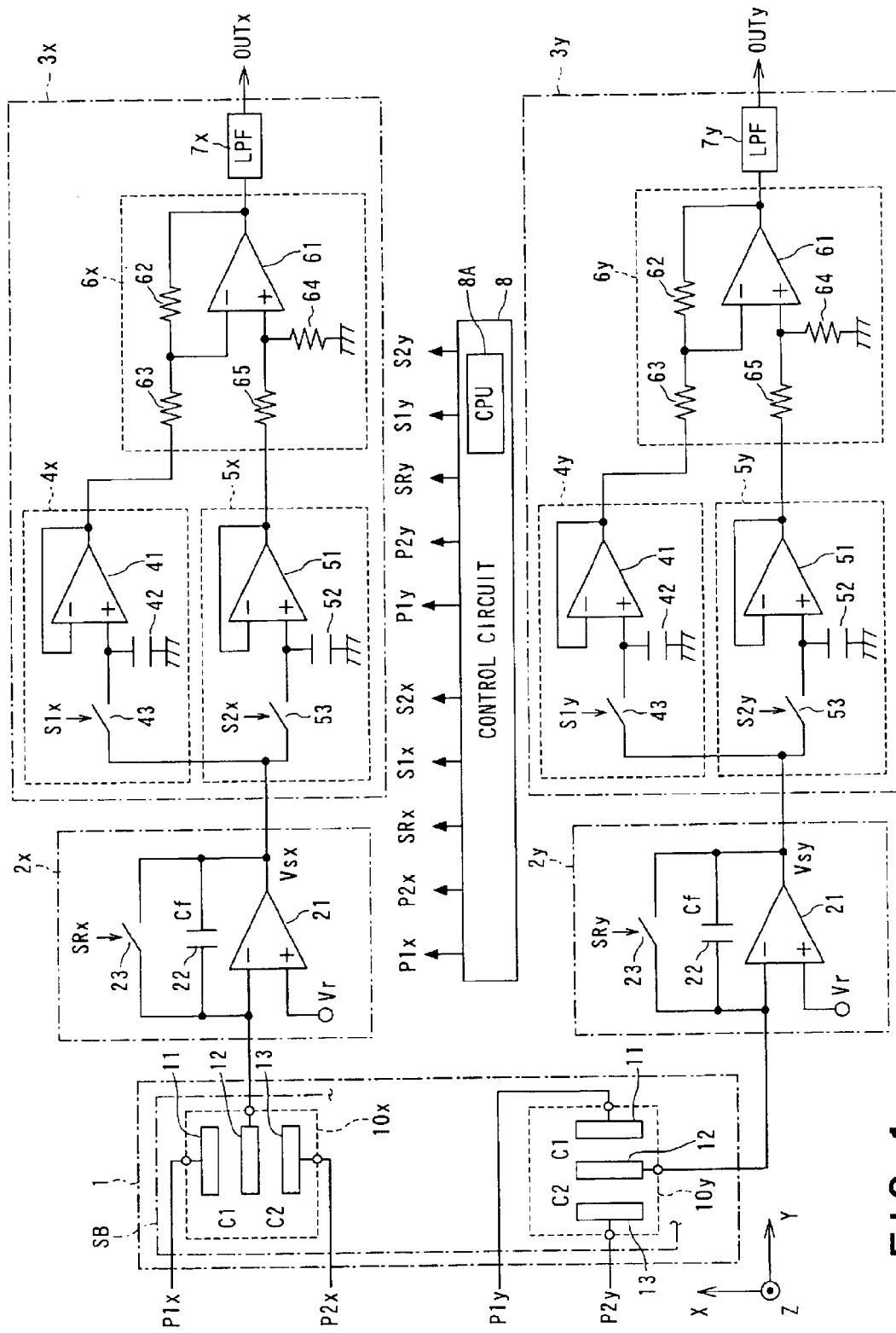
FIG. 1 is a circuit diagram showing the configuration of an acceleration detecting apparatus according to an embodiment of the present invention, the acceleration detecting apparatus serving as a physical quantity detecting apparatus according to the present invention.

As shown in FIG. 1, the acceleration detecting apparatus according to the present embodiment has sensor elements 10x and 10y which are in charge of sensing acceleration to be generated in the X-axis and Y-axis directions, respectively, and outputting corresponding voltage signals to the sensed acceleration. Moreover, the acceleration detecting apparatus has C-V (capacitance-voltage) conversion circuits 2x and 2y and signal processing circuits 3x and 3y, which are arranged separately for each of the sensor elements 10x and 10y.

In this description and the appended drawings, a suffix "x" attached to the references for components, blocks, and signals show that those components, blocks, and signals belong to a configuration to detect the acceleration generated in the X-axis direction. This is true of a suffix "y" attached to the references for components, blocks, and signals, which show that those factors belong to a further configuration to detect the acceleration generated in the Y-axis direction. In the following, an "X-axis directional" relates to detecting acceleration in the X-axis direction and a "Y-axis directional" relates to detecting acceleration in the Y-axis direction.

Of the sensor elements 10x and 10y, one element 10x is equipped with fixed electrodes 11 and 13 and a movable electrode 12 whose position can be shifted depending on acceleration generated in the X-axis direction. A first capacitor (capacitance is C1) is thus formed between one fixed electrode 11 and the movable electrode 12, whilst a second capacitor (capacitance is C2) is thus formed between the other fixed electrode 13 and the movable electrode 12. Both the first and second capacitors are placed to form their capacitances C1 and C2 into a differential capacitance. In other words, the first and second capacitors are coupled with each other electrically in series and a capacitance difference (=C1−C2) varies as the movable electrode 12 displaces its position depending on acceleration in the X-axis direction.

The sensor element 10x has both nodes connected to the fixed electrodes 11 and 13, respectively. Driving square waves P1x and P2x, which are opposite in phase to each other (i.e., a phase difference of 180 degrees), are applied to the two nodes, respectively. Each of the driving square waves P1x and P2x inverts at a frequency sufficiently higher than a resonance frequency of the movable electrode 12.

On the other hand, the sensor element 10y has almost the same configuration as the sensor element 10x. That is, fixed substrates 11 and 13 and a movable substrate 12 are included in the sensor element 10y in the same way as the above.

However there is one exception that those substrates are arranged to allow the movable electrode 12 to be displaced responsively to acceleration in the Y-axis direction. Like the sensor element 10x, to both nodes of the sensor element 10y, to which the fixed electrodes 11 and 13 are coupled, opposite-phase square waves P1y and P2y are applied as driving signals, respectively. Those driving squire waves also invert at a frequency sufficiently higher than the resonance frequency of the movable electrode 12.

In the present embodiment, those two sensor elements 10x and 10y are formed on the same semiconductor substrate SB to form a single acceleration sensor 1.

Descriptions will now be given to the C-V conversion circuits 2x and 2y and the signal processing circuits 3x and 3y, Both the two C-V conversion circuits 2x and 2y have the same circuitry and both the two signal processing circuits 3x and 3y have the same circuitry, and the description will now be focused on the X-axis directional ones (i.e., the C-V conversion circuit 2x and signal processing circuit 3x).

The C-V conversion circuit 2x is provided with an operational amplifier 21, a third capacitor 22, and a switch 23, as shown in FIG. 1. Of these, the operational amplifier 21 provides two terminals serving as an input and an output of this circuit 2x. The third capacitor 22 (whose capacitance is Cf) is electrically connected between an inverting input terminal (negative input) and an output terminal of the operational amplifier 21. The switch 23 is also electrically connected in parallel to the capacitor 22, that is, between the inverting input terminal and the output terminal of the operational amplifier 21. Hence the C-V conversion circuit 2x is formed into a switched capacitor circuit.

The inverting input terminal of the operational amplifier 21 is electrically connected to an output terminal of the sensor element 10x (to be specific, the movable electrode 12 functioning as a connecting point between the first and second capacitors). A non-inverting input terminal (positive input) of the operational amplifier 21 is electrically connected to a power supply to receive a constant reference voltage Vr therefrom. In the present embodiment, the reference voltage Vr is set to a value (=2.5 V) which is half the power supply voltage (5 V in the present embodiment) to each circuit component in the apparatus. The switch 23 is configured to be switched on/off by a switch signal SRx supplied thereto.

The signal processing circuit 3x is placed to sample and hold an output voltage Vsx from the C-V conversion circuit 2x (i.e., the output of the operational amplifier 21) at intervals in synchronism with the square waves P1x and P2x. In this circuit 3x, signals resulting from the sample-and-hold processing are then subjected to predetermined signal processing to output a detection signal OUTx that depends on an X-axis directional acceleration acting on the movable electrode 12 of the sensor element 10x. In order to have such operations, the signal processing circuit 3x is provided with two sample-and-hold circuits 4x and 5x, a differential amplifier circuit 6x, and a low-pass filter (LPF) 7x. The differential amplifier circuit 6x applies differential amplification to outputs from the two sample-and-hold circuits 4x and 5x.

The sample-and-hold circuit 4x is equipped with an operational amplifier 41 whose inverting input terminal is electrically connected with its output terminal, a capacitor 42 for sample-and-hold processing, and a switch 43. The capacitor 42 is inserted between a non-inverting input terminal of the operational amplifier 41 and the ground (the potential is 0 V). Further, the switch 43 is placed to open and close between the non-inverting input terminal of the operational amplifier 41 and the output terminal of the operational amplifier 21 of the C-V conversion circuit 2x.

When the switch 43 is switched on in response to a switch signal S1x, the sample-and-hold circuit 4x operates to sample (memorize) the output voltage Vsx from the C-V conversion circuit 2x, and hold the sampled voltage Vsx even after switching off the switch 43. This holding operation allows the operational amplifier 41 to maintain its output at the sampled voltage Vsx.

Like the sample-and-hold circuit 4x, the other sample-and-hold circuit 5x is equipped with an operational amplifier 51 whose inverting input terminal is electrically connected with its output terminal, a capacitor 52, and a switch 53. The capacitor 52 is inserted between a non-inverting input terminal of the operational amplifier 51 and the ground. Further, the switch 53 is placed to open and close between the non-inverting input terminal of the operational amplifier 51 and the output terminal of the operational amplifier 21 of the C-V conversion circuit 2x.

In this sample-and-hold circuit 5x, the same sample-and-hold operation as the above is carried out. That is, when the switch 53 is switched on in response to a switch signal S2x, the sample-and-hold circuit 5x operates to sample the output voltage Vsx from the C-V conversion circuit 2x, and hold the sampled voltage Vsx even after switching off the switch 53. This holding operation allows the operational amplifier 51 to maintain its output at the sampled voltage Vsx.

The differential amplifier circuit 6x is provided with an operational amplifier 61 and resistors 62 to 65. Of the resistors 62 to 65, the resistor 62 is connected between an inverting input terminal and an output terminal of the operational amplifier 61. The resistor 63 is connected between the inverting input terminal of the operational amplifier 61 and the output terminal of the foregoing operational amplifier 41. The resistor 64 intervenes to connect a non-inverting input terminal of the operational amplifier 61 and the ground. Further, the resistor 65 is placed to connect the non-inverting input terminal of the operational amplifier 61 and the output terminal of the operational amplifier 51. Hence the differential amplifier circuit 6x makes its operational amplifier 61 provide, at an output terminal thereof, a voltage signal corresponding to a difference between an output from one sample-and-hold circuit 5x (i.e., the output voltage of the operational amplifier 51) and an output from the other sample-and-hold circuit 4x (i.e., the output voltage of the operational amplifier 41).

The low-pass filter 7x is disposed after the differential amplifier circuit 6x, so that the output of the differential amplifier circuit 6x undergoes low-pass filtering, thus removing high-frequency noise from the output signal. The noise-removed (i.e., the low-pass-filtered) output signal is provided as the detection signal OUTx.

Moreover, in the Y-axis directional C-V conversion circuit 2y, an inverting input terminal of an operational amplifier 21 is electrically connected with the output terminal (i.e., movable electrode 12) of the sensor element 10y and a switch 23 is responsive to a switch signal SRy to make on/off. In the Y-axis directional signal processing circuit 3y, there are provided sample-and-hold circuits 4y and 5y including switches 43 and 53, respectively. The switches 43 and 53 can be switched on/off responsively to switch signal S1y and S2y, respectively.

In addition to the above configurations, the acceleration detecting apparatus according to the present embodiment is provided with a control circuit 8. This control circuit 8 includes, as its essential component, a microcomputer 8A.

Figure 2:
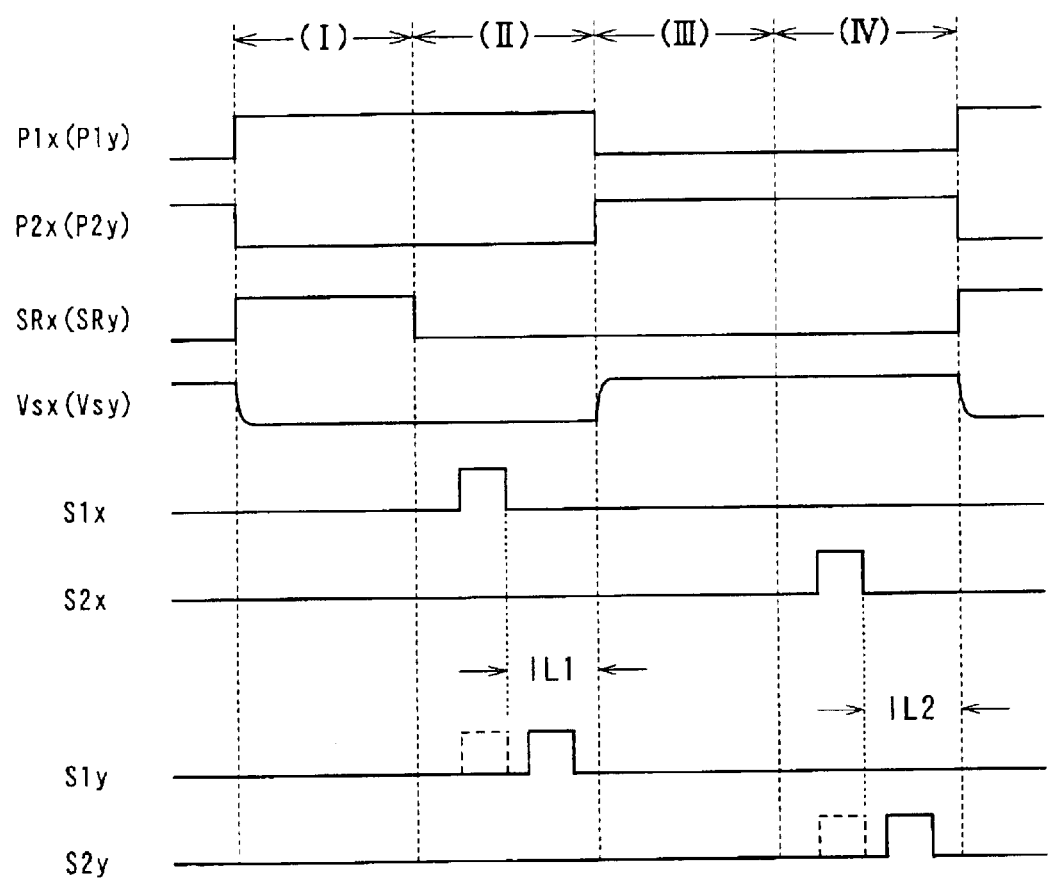
FIG. 2 is a timing chart explaining the operations of the acceleration detecting apparatus of the embodiment.

Hence, based on a software-based operation of the microcomputer (CPU) BA allows the control circuit 8 to provide the foregoing square waves P1x, P2x, P1y and P2y and the switch signals SRx, S1x, S2x, SRy, S1y and S2y at timings shown FIG. 2. The present embodiment employs a manner of switching on the corresponding switches when the switch signals SRx, S1x, S2x, SRy, S1y and S2y become high in level. The control circuit 8 may be produced, if necessary, by using digital logic circuits.

In the present acceleration detecting apparatus, the detection signals OUTx and OUTy from the signal processing circuits 3x and 3y are supplied to the control circuit 8 or a processor different from the control circuit 8. Either the control circuit 8 or the processor uses the detection signals OUTx and OUTy to compute values of the acceleration generated in both the X-axis and Y-axis directions.

The operations of the present acceleration detecting apparatus will now be explained with reference to FIG. 2.

At first, an explanation will be given to the X-axis directional channel consisting of the sensor element 10x, C-V conversion circuit 2x and signal processing circuit 3x.

As described, to the fixed electrodes 11 and 13 of the sensor element 10x, the mutually-opposite-phase square waves P1x and P2x are applied as driving signals, receptively, which are shown at the upper first and second timing charts in FIG. 2. Each of the square waves P1x and P2x has an amplitude of 5 V (low=0 V; high=5 V).

The movable electrode 12 in the sensor element 10x receives application of a reference voltage Vr of 2.5 V, as a bias voltage, under the operation of the operational amplifier 21 in the C-V conversion circuit 2x. This voltage application produces a voltage difference of 2.5 V always applied to the first capacitor (capacitance C1) formed between the movable and fixed electrodes 12 and 11 and the second capacitor (capacitance C2) formed between the movable and fixed electrodes 12 and 13.

Because there is a phase difference of 180 degrees between the two driving square waves P1x and P2x, the movable electrode 12, which is common use for both the first and second capacitors, is accumulated with electric charge of which amount is proportional to both of a difference of "C1−C2" and the amplitude (=5 V) of each square wave P1x (P2x). Changes in the difference "C1−C2" are attributable to positional displacements of the movable electrode 12, which are thus proportional to changes in the acceleration. It is therefore possible to detect changes in the capacitance (i.e., changes in the acceleration) by detecting changes in the amount of the electric charge.

As illustrated in FIG. 2, the detecting state is classified into four stages (I) to (IV). The stage (I) gives a reset operation, the stage (II) gives a sample-and-hold operation 1, the stage (III) gives a switching operation of the square waves, and the stage (IV) gives a sample-and-hold operation 2. A train of these stages starting from the reset, sample-and-hold 1, switching the square waves, and sample-and-hold 2 is repeated, for example, at intervals of 10 $\mu$sec. In this embodiment, an assumption is made such that the capacitors C1 and C2 are set to be C1>C2.

During the interval of the reset stage (I), the switch signal SRx makes the switch 23 of the C-V conversion circuit 2x switch on, thereby shortening both the ends of the capacitor 22 (which is referred to as a reference state). In this reference state, both of the relationship of C1>C2 and a relationship of the voltages applied to the fixed electrodes 11 and 13 (that is, P1x=5 V and P2x=0 V) cause the movable electrode 12 to have the negative electric charge of which amount is larger than the positive one.

In the next stage (II), the output voltage Vsx of the C-V conversion circuit 2x which is obtained in the reference state (the switch 23 is made on) is sampled by the sample-and-hold circuit 4x for memorization. This sampling is realized by the switch signal S1x that allows the switch 43 in the sample-and-hold circuit 4x to switch on only during a predetermined period of time.

The stage (II) is followed by the stage (III), which begins with an inversion of the voltage of each of the square waves P1x and P2x applied to the fixed electrodes 11 and 13, from 5 V to 0 V and from 0 V to 5 V, respectively. In response to those inversions of the driving square waves P1x and P2x, the movable electrode 12 is forced to have the electric charge in which the positive one is larger in amount than the negative one. Because a closed circuit connects the movable electrode 12 and the capacitor 22 of the C-V conversion circuit 2x, the amount of electric charge obtained during the stage (I) has been preserved. In consequence, the negative electric charge overflowing from the balanced negative and positive electric charges at the movable electrode 12 is obliged to move to the capacitor 22 (connecting to the non-inverting input terminal of the operational amplifier 21).

On account of this move of the negative electric charge, the positive electric charge is forcibly accumulated at the opposite electrode of the capacitor 22 which is connected to the output terminal of the operational amplifier 21. Thus the output voltage Vsx of the C-V conversion circuit 2x experiences a change proportional to an amount of the moved electric charge (corresponding to "C1−C2") and inversely proportional to a capacitance Cf of the capacitor 22, based on a formula of Q=Cf·V.

Then the stage (IV) follows. In this stage, at a predetermined time instant when the output Vsx of the C-V conversion circuit 2x can be regarded as being sufficiently stabilized after switching over the square waves P1x and P2x, the sampling is made. That is, at that timing, the output voltage Vsx is sampled and memorized by the sample-and-hold circuit 5x. Specifically, the switch signal S2x makes the switch 53 of the sample-and-hold circuit 5x to turn on during a predetermined period of time.

Finally, the LPF 7x of the signal processing circuit 3x provides, as the detection signal OUTx, a voltage signal depending on the acceleration generated in the X-axis direction. The voltage signal, which has an amount obtained by subtracting an output value SH1 of the sample-and-hold circuit 4x from an output value SH2 of the sample-and-hold circuit 5x, is proportional to both the difference "C1−C2"and the amplitudes (=5 V) of the driving square waves P1x and P2x and is inversely proportional to the capacitance Cf of the capacitor 22, where the output values SH1 and SH2 are output voltages of the C-V conversion circuit 2x memorized in the stages (II) and (IV), respectively. The inversely proportional voltage is defined by SH2−SH1={(C1−C2)/Cf}·5[V].

On the other hand, the Y-axis directional channel consisting of the sensor element 10y, C-V conversion circuit 2y and signal processing circuit 3y is controlled essentially in the same manner as the X-axis directional channel with the exception of control timing. Practically, switches 43 and 53 of sample-and-hold circuits 4y and 5y are switched on and off in a different timing manner from those of the sample-and-hold circuits 4x and 5x.

As shown in FIG. 2, though Y-axis directional square waves P1y and P2y and a switch signal SRy are outputted from the control circuit 8 at the same timing as those for the X-axis direction, Y-axis directional switch signals S1y and S2y are different in timing from the X-axis directional switch signals S1x and S2x. To be specific, during the stages (II) and (IV) shown in FIG. 2, the control circuit 8 is configured such that the Y-axis directional switch signals S1y and S2y are positively shifted in their issue timings from the X-axis directional switch signals S1x and S2x. This shift of timing makes it possible to positively shift sampling timing between the X-axis and Y-axis directional signal processing circuits 3x and 3y.

A more detailed explanation can be given as follows. The switch signal S1y rises up to a high level lasting only a predetermined period of time within a remaining interval IL1 of the stage (II), the interval IL1 starting from the return of the switch signal Six to its low level to the end of the stage (II). In a similar manner to this, the switch signal S2y rises up to a high level lasting only a predetermined period of time within a remaining interval IL2 of the stage (IV), the interval IL2 starting from the return of the switch signal S2x to its low level to the end of the stage (IV). Accordingly, the sampling timing in the sample-and-hold circuits 4x and 4y are shifted from each other and the sampling timing in the sample-and-hold circuits 5x and 5y are also shifted from each other.

The reason why the sampling timing is mutually shifted as above between the X-axis directional circuitry and the Y-axis directional circuitry is preventing an interference therebetween. In other words, the interference will occur when sampled signals in one-side circuitry penetrate into the other-side circuitry due to a coupling between the circuit signal lines by way of a parasitic capacitor, fluctuations in the sensor substrate potential, a bypassing signal, and others. If such an occasion occurs, the sampled signals become erroneous. This erroneous sampling operation can be avoided or greatly improved by shifting the sampling timing as above.

Figure 3:
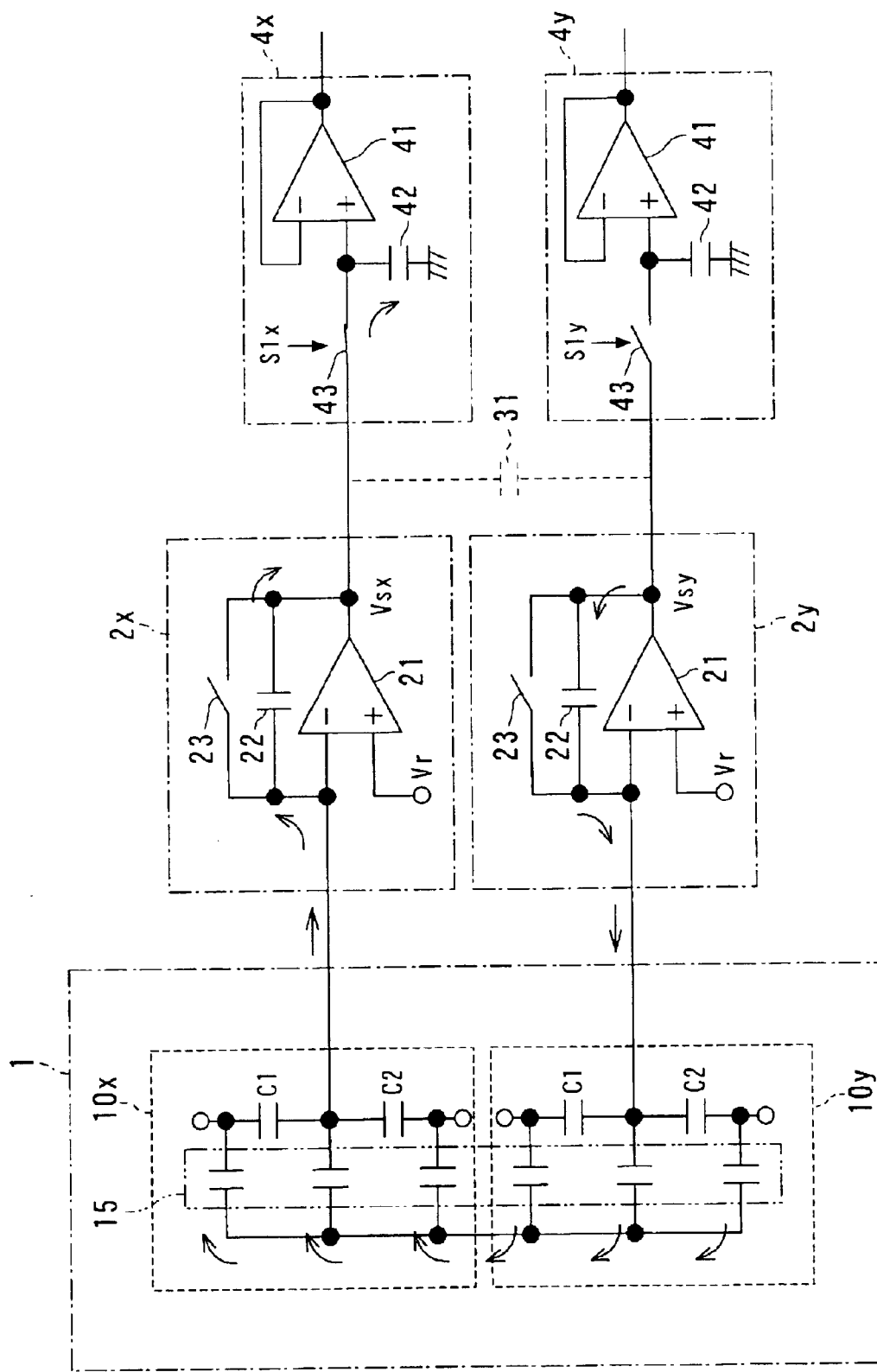
FIG. 3 is a circuit diagram employed to explain advantages of the embodiment, together with the causes of problems inherent to the prior art.

A practical example is as follows. First, as shown in FIG. 3, assume that there is a parasitic capacitor 31 between the output signal lines from both the X-axis and Y-axis directional C-V conversion circuits 2x and 2y.

In this situation, there is a possibility that the sampling operations of the X-axis directional sample-and-hold circuits 4x and 5x toward the output voltage Vsx of the X-axis directional C-V conversion circuit 2x cause the output voltage Vsy of the Y-axis directional C-V conversion circuit 2y to fluctuate. In the similar manner to the above, there is a possibility that the sampling operations of the Y-axis directional sample-and-hold circuits 4y and 5y toward the output voltage Vsy of the Y-axis directional C-V conversion circuit 2y cause the output voltage Vsx of the X-axis directional C-V conversion circuit 2x to fluctuate.

Figure 4A:
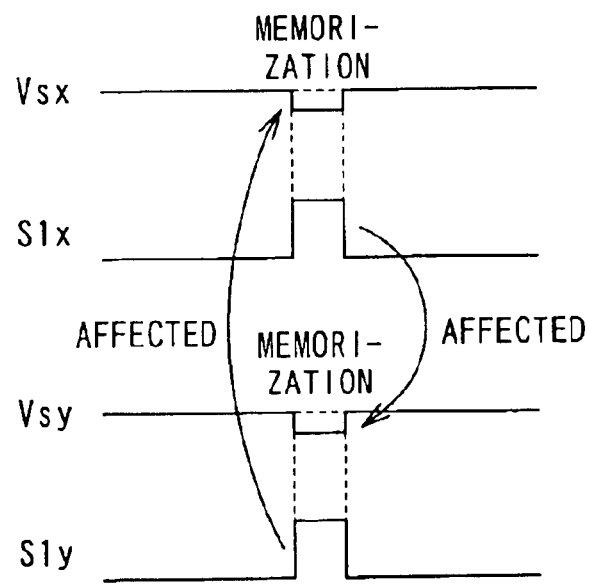
FIG. 4A is a timing chart explaining a problem concerning the prior art.

Hence, if both the X-axis and Y-axis directional sample-and-hold circuits 4x and 4y sample signals at the same timing, as illustrated in FIG. 4A, there occurs various problems. That is, there is a probability that the output voltage Vsy of the C-V conversion circuit 2y, which has fluctuated due to an influence of the sampling operation at the sample-and-hold circuit 4x, is erroneously memorized by the Y-axis directional sample-and-hold circuit 4y. The opposite situation to the above is also true. There is also a probability that the output voltage Vsx of the C-V conversion circuit 2x, which has fluctuated due to an influence of the sampling operation at the sample-and-hold circuit 4y, is erroneously memorized by the X-axis directional sample-and-hold circuit 4x.

As a result, the voltage signals sampled and memorized by the sample-and-hold circuits 4x and 4y become erroneous, not being reliable. The acceleration to be generated in both the X-axis and Y-axis directions cannot be detected accurately any more. This inconvenience is true of the relationship between the X-axis and Y-axis directional sample-and-hold circuits 5x and 5y.

In particular, the present acceleration detecting apparatus employs the single acceleration sensor 1 consisting of the two sensor elements 10x and 10y formed on the same semiconductor substrate. Hence a possibility is inevitable that the two output terminals (that is, the movable electrodes 12) of the two sensor elements 10x and 10y are linked with each other by way of a parasitic capacitor 15 on the semiconductor substrate of the sensor 1. Signal lines routing from the sensor elements 10x and 10y to the C-V conversion circuits 2x and 2y are thus electrically linked with each other through the parasitic capacitor 15. On account of this liking route, the sampling operation carried out by the sample-and-hold circuit in one of the signal processing circuits 3x and 3y has, in sampling precision, a large influence on that carried out by the sample-and-hold circuit in the other signal processing circuit.

In order to remove such a drawback or improve greatly such an inconvenient situation, the present acceleration apparatus has adopted the positive timing shift manner, as shown in FIG. 2. The sampling timing between the signal processing circuits 3x and 3y (in detail, the sampling timing between the sample-and-hold circuits 4x and 4y and that between the sample-and-hold circuits 5x and 5y) is shifted deliberately, as explained before.

It is therefore possible to eliminate or improve a situation where the sampling operation carried out by the sample-and-hold circuit of each of the signal processing circuits 3x and 3y influences largely the other one in terms of sampling accuracy. Errors of the voltage signals sampled and memorized in each sample-and-hold circuit can be avoided or lowered greatly.

Figure 4B:
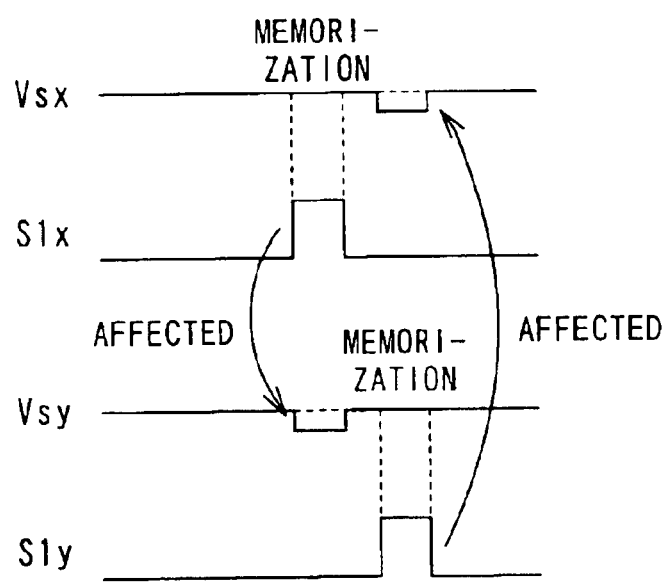
FIG. 4B is a timing chart explaining an advantageous operation carried out by the apparatus according to the embodiment.

For example, as illustrated in FIG. 4B, an erroneous sampling operation can be avoided. In detail, even when there is a fluctuation in the output voltage Vsy of the Y-axis directional C-V conversion circuit 2y during the sampling operation carried out by the X-axis directional sample-and-hold circuit 4x, the sample-and-hold circuit 4y is prevented from memorizing an erroneously-fluctuating output voltage Vsy of the C-V conversion circuit 2y caused by the sampling operation at the sample-and-hold circuit 4x. This is because the Y-axis directional sample-and-hold circuit 4y is controlled to sample the output voltage Vsy of the C-V conversion circuit 2y at different timings from those for the sample-and-hold circuit 4x.

The similar timing control is applied to the X-axis directional sample-and-hold circuit 4x. Namely, even when there is a fluctuation in the output voltage Vsx of the X-axis directional C-V conversion circuit 2x during the sampling operation carried out by the Y-axis directional sample-and-hold circuit 4y, the sample-and-hold circuit 4x is prevented from memorizing an erroneously-fluctuating output voltage Vsx of the C-V conversion circuit 2x caused by the sampling operation at the sample-and-hold circuit 4y. This is because the X-axis directional sample-and-hold circuit 4x is controlled to sample the output voltage Vsx of the C-V conversion circuit 2x at different timings from those for the sample-and-hold circuit 4y.

This principle is also true of the relationship between the X-axis and Y-axis directional sample-and-hold circuits 5x and 5y.

Accordingly, the acceleration detecting apparatus according to the present embodiment is able to precisely detect acceleration generated in both the X-axis and Y-axis directions to the sensor 1. This sufficiently enhances the advantage of being compact stemming from forming the two sensor elements 10x and 10y on the same substrate SB.

In the present embodiment, a member composed of the X-axis directional sensor element 10x and C-V conversion circuit 2x and a further member composed of the Y-axis directional sensor element 10y and C-V conversion circuit 2y correspond to a plurality of sensing units each sensing a physical quantity to be detected and outputting a voltage signal of which value depends on the physical quantity.

Various modifications of the foregoing embodiment can be provided as configuration still falling into the gist of the present invention.

For example, the number of sensor elements is not always limited to the foregoing two sensor elements 10x and 10y to detect acceleration in the two directions. Three of more sensor elements can be adopted, as long as signal processing circuits designed to operate at mutually shifted sampling timings are provided to the three or more sensor elements, respectively.

With respect to the physical quantity to be detected, variations are also provided. Physical quantities other than acceleration, such as yaw rate and pressure, can be detected in the same manner as above. Further, the sensor functioning as the detection means can be produced into other types, not confined to the capacitive sensor of which capacitor depends on mechanical energy. The other types of sensors include, for example, a temperature sensor outputting a voltage signal in compliance with changes in temperature.

The control circuit 8 shown in FIG. 1 may still be modified into other configurations, not limited to the configuration shown in FIG. 1, where the square wave P1x and P2x and switch signal SRx, which are all for the X-axis directional channel, and the square wave P1y and P2y and switch signal SRy, which are all for the Y-axis directional channel, are separated from each other. One modification is to form the control circuit 8 to provide only the waves and signal for one directional channel; for example, the square waves P1x and P2x and the switch signal SRx, not using the square waves P1y and P2y and the switch signal SRy. In such a case, the square waves P1x and P2x are supplied as well to the fixed electrodes 11 and 13 of the Y-axis directional sensor element 10y and the switch signal SRx is supplied as well to the switch 23 of the Y-axis directional C-V conversion circuit 2y.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-72175 filed on Mar. 17, 2003 including the specification, claims, drawings and summary is incorporated herein by reference in its entirety.

What is claimed is:

1. An apparatus for detecting a physical quantity to be detected, comprising:
   a plurality of sensing units each sensing the physical quantity to output a voltage signal changing depending on the sensed physical quantity;
   a plurality of processors each sampling and holding, at intervals, the voltage signal outputted from each of the sensing units; and
   a controller controlling the plurality of processors to permit the processors to perform sampling operations at predetermined different timings shifted from each other.

2. The apparatus according to claim 1, wherein each of the plurality of sensing units is provided with a capacitive sensor element of which capacitance changes depending on the physical quantity to be detected and a capacitance-voltage converter converting a change in the capacitance of the sensor element to output the voltage signal, and
   wherein the sensor elements of the plurality of sensing units are formed on the same substrate to form a single sensor.

3. The apparatus according to claim 2, wherein each of the sensor elements has a first capacitor and a second capacitor electrically connected in series to each other, at least one of the first and second capacitors having a capacitance changing depending on the physical quantity to be detected and the first and second capacitors receiving first and second driving square wave signals of which phases are opposite to each other, and
   the capacitance-voltage converter has a circuit converting a difference between capacitance values of the first and second capacitors to the voltage signal, an input of the circuit being electrically connected to a joint point electrically connecting the first and second capacitors.

4. The apparatus according to claim 1, wherein the physical quantity is acceleration acting on the apparatus.

5. An apparatus for concurrently detecting a plurality of physical quantities to be detected, comprising:
   a plurality of sensing units being formed on a same substrate to form a single sensor and each sensing each of the physical quantities to output a voltage signal changing depending on each of the sensed physical quantities;
   a plurality of processors each sampling and holding, at a predetermined frequency, the voltage signal outputted by each of the sensing units to produce sampled and held voltage signals to be outputted from the apparatus as information indicative of the plurality of physical quantities to be detected; and
   a controller controlling the plurality of processors to allow the processors to perform sampling operations at predetermined different phases shifted from each other during an interval defined by the predetermined frequency.

6. The apparatus according to claim 5, wherein each of the plurality of sensing units is provided with a capacitive sensor element of which capacitance changes depending on each of the physical quantities to be detected and a capacitance-voltage converter converting a change in the capacitance of the sensor element to output the voltage signal.

7. The apparatus according to claim 6, wherein the capacitive sensor element is provided with two fixed substrates and one movable substrate electrically connected to the capacitance-voltage converter, the two fixed substrates and the one movable substrate being aligned in a detection axis in an order of one fixed electrode, the movable electrode, and the other fixed electrode to form first and second capacitors electrically connected in series, the first and second capacitors receiving first and second driving square wave signals of which phases are opposite to each other, and the detection axis being set to detect one of the plurality of physical quantities.

8. The apparatus according to claim 7, wherein the capacitance-voltage converter has a circuit converting a difference between capacitance values of the first and second capacitors to the voltage signal, an input of the circuit being electrically connected to a joint point electrically connecting the first and second capacitors.

9. The apparatus according to claim 5, wherein the plurality of physical quantities are a plurality of types of acceleration generated in a plurality of directions set to the sensor.

10. The apparatus according to claim 5, wherein the plurality of types of acceleration are two types of acceleration generated in two different directions set to the sensor.

11. The apparatus according to claim 10, wherein the two different directions are two of three mutually orthogonal axis directions set to the sensor.

* * * * *